Aug. 23, 1932.  P. A. CUTTER  1,872,903
VEGETABLE AND FRUIT GRADING APPARATUS
Filed Nov. 5, 1928
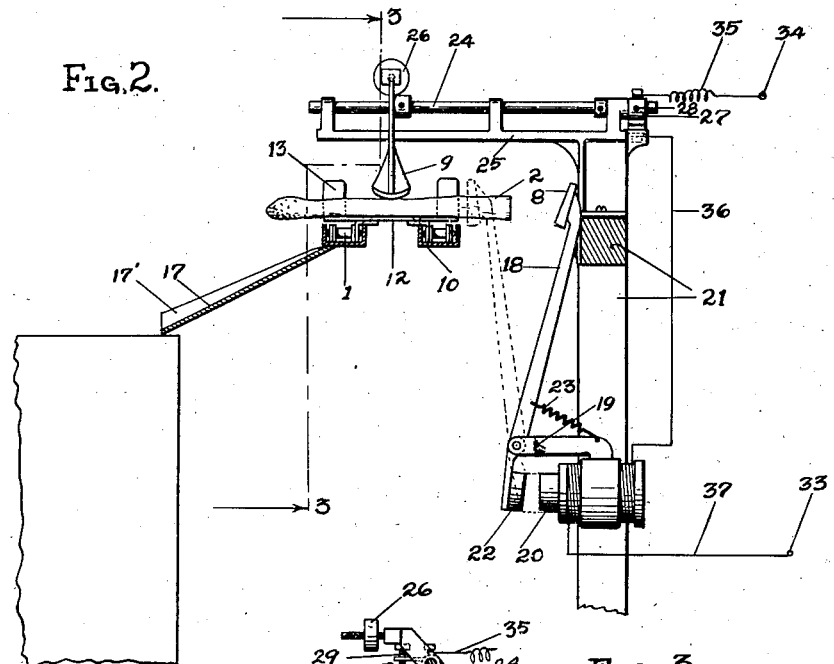
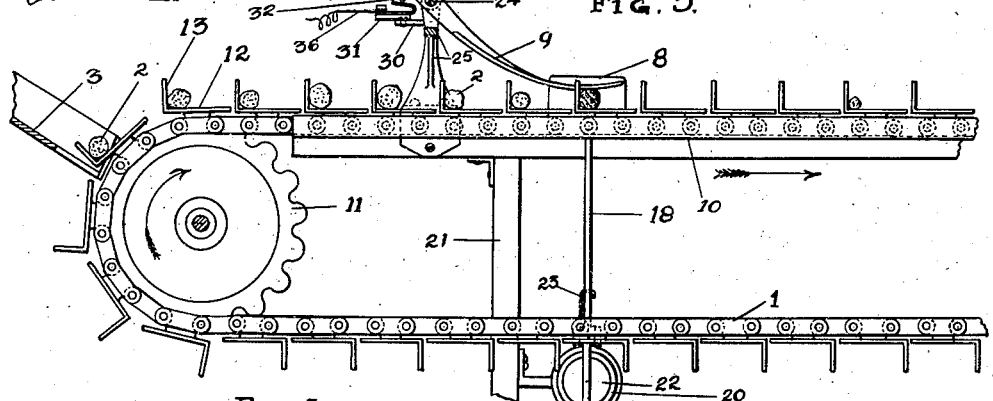
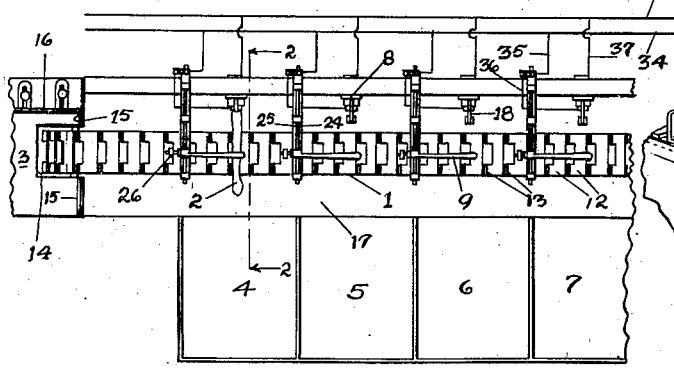
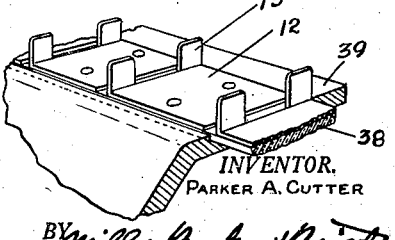
INVENTOR.
PARKER A. CUTTER
ATTORNEYS.

Patented Aug. 23, 1932

1,872,903

UNITED STATES PATENT OFFICE

PARKER A. CUTTER, OF SAN FRANCISCO, CALIFORNIA, ASSIGNOR OF THREE-FOURTHS TO GOLDEN STATE ASPARAGUS CO., OF SAN FRANCISCO, CALIFORNIA, A CORPORATION OF CALIFORNIA

VEGETABLE AND FRUIT GRADING APPARATUS

Application filed November 5, 1928. Serial No. 317,162.

This invention relates to vegetable and fruit grading apparatus, and has for its objects apparatus of this kind which will effectually separate into different divisions the various sizes of fruit or vegetable units, and which will be particularly effective in the size grading or separation of asparagus shoots without causing injury to the tender sprouts of grass.

Briefly described my apparatus comprises a conveyor along which the units of the vegetable or fruit to be graded are conveyed in spaced tandem relation, while positioned along the conveyor at spaced points are devices arranged to strike and project the units from the conveyor into separate bins arranged at the other side thereof.

To actuate the ejectors so that they will operate respectively on different sizes of the units being conveyed on the conveyor, I provide for each ejector a trailing finger which overlies the units so that they all pass thereunder, and which fingers are set to control the movements of their respective ejectors when lifted by a certain size unit, and no other size. In the showing of this application I preferably operate the ejectors by electricity the circuits of which are closed by the lifting of the trailer fingers by the units so as to operate their respective ejectors when lifted to a predetermined point.

In the drawing Fig. 1 is a plan view of my apparatus.

Fig. 2 is a vertical cross section of the apparatus taken along the line 2—2 of Fig. 1 and showing a piece of asparagus operating the grading trip or trailing finger.

Fig. 3 is a longitudinal elevation taken along the line 3—3 of Fig. 2 showing but one of the grading fingers.

Fig. 4 is a perspective view of an optional form of conveyor for carrying the fruit or vegetable units along for ejection by the ejectors.

In the present disclosure the apparatus shown and described has been especially devised for the size grading of asparagus shoots though no limitation is to be implied thereby as it is manifest that the apparatus with slight modification may be used for the size grading of any kind of fruits or vegetables.

In Fig. 1 of the drawing is shown the general plan of the apparatus and in which an endless conveyor 1 receives the asparagus shoots 2 from a feeder board 3 and transports them horizontally adjacent a series of bins 4, 5, 6 and 7 into which the asparagus is ejected from the conveyor by means of ejector plates 8 controlled by the trailing fingers 9 which ride on the asparagus shoots as they travel along the conveyor. The ejector plates operate electrically through a circuit controlled by the fingers 9 so that each ejector operates on one size only of asparagus in the manner to be described.

The conveyor of Figs. 1, 2 and 3 is of the double strand chain type guided in spaced channels 10 and passing over sprockets at the ends in the well known manner, the two at one end being shown at 11, the sprocket at either end being driven in any desired manner not shown.

Secured to the spaced strands of chain and extending transversely thereacross are a series of plates 12, each provided with a pair of upstanding lugs 13 which are spaced apart so as to provide a relatively large gap between them for the operation of the trailing fingers 9. The conveyor may be horizontal or inclined somewhat so as to keep the asparagus adjacent the lugs 13 and when in motion the conveyor travels in the direction indicated by the arrows on Fig. 3 and each pair of lugs 13 carries along a spear of asparagus lying transversely of the conveyor and supported on the plates 12.

The feeder board 3 is inclined downwardly toward the conveyor and provided at its lower end with a gap 14 through which the conveyor passes in coming around the sprockets. And the bifurcated ends of the feeder board are provided with an upwardly extending edge or stops 15 so that as the asparagus is fed down the board it will come to rest against the stops, and the lugs 13 of the conveyor plate 12 in passing through the gap 14 will pick up the asparagus shoots one at a time. It is also desirable that the feeder board be provided with a guiding strip 16 for aligning the butts of the asparagus shoots so that they will all be in the same relation to the striker plate for ejection from the conveyor, and it is also desirable that this guiding strip 16 be adjustable laterally on the feeder board as indicated so that it may be set for any length of shoots being operated on.

It is to be understood that the asparagus shoots may be fed down the feeder board either by hand or by any suitable mechanism not involved in the present invention.

Arranged along the side of the conveyor is a board or plate 17 for guiding the asparagus into the various bins 4, 5, 6, 7 etc., when ejected from the conveyor, and the board may be provided with separating strips between the various bins such as indicated at 17′ in Fig. 2, if desired.

It is presumed that the asparagus shoots be fed down to the conveyor with the tips of the asparagus all pointing one way and directed over the slanting board 17 as shown in Fig. 2, so that the ejector plates 8 may strike against the butt of each shoot in ejecting it from the conveyor into the bin. The ejector plates 8 are each secured to an arm 18 pivoted to a bracket 19 extending from the frame of an electromagnet 20 in turn supported on an upright 21 and the short end of the arm or lever 18 is provided with an armature 22 which when the magnet is energized is drawn toward the same to violently throw the ejector plate 8 outward to the dotted position shown in Fig. 2, and upon de-energizing of the magnet the lever 18 is returned by means of a spring 23 to the position shown in full line with the upper end of the lever resting against the framing of the apparatus.

The grade controlling fingers 9 are pivotally mounted so as to lightly rest upon the asparagus shoots in the gaps between the lugs 13 of the conveyor so that they may freely rise and fall as the shoots of asparagus pass beneath them, and to this end the arms are supported at their upper ends on a light shaft 24 rotatably carried on a bracket 25 supported on the framing 21 and extending over the conveyor. The grading fingers 9 are adjustable along shaft 24 so as to provide for bringing them into best operating position on the asparagus or other vegetable or fruit units passing beneath, and are preferably each provided with a counter-weight 26 adjustable in and out with relation to the axis of shaft 24 so as to reduce to a minimum the weight of the finger upon the fruit or vegetable being graded so as not to harm the same.

At the rearward end of shaft 24 is a collar 27 adjustably secured thereto by means of set screw 28, and carrying at one side thereof a lug provided with an electrical contact 29, while at a point on the bracket 25 just beneath collar 27 is a lug 30 on which is supported an insulating plate 31 in turn supporting a resilient electrical contact 32 which closes against contact 29 upon rocking of the small shaft 24 when the grading finger 9 is lifted by the asparagus shoots in passing thereover.

Electrical contact 29 preferably takes the form of a thumb screw so that it may be adjusted with respect to contact 32 and thereby the point of closing of the contacts may be determined with respect to the lifting of the trailer finger 9, and thus it may be set to close when lifted to a predetermined degree by a certain size or diameter shoot of asparagus. The contact 32 is made resilient, preferably of a flat spring bent in the form of a U so that in case an unusually large spear of asparagus passes beneath the finger 9 the contacts could compress without injuring the apparatus.

Electrical energy is brought to the apparatus through wires 33 and 34, and conveyed in separate circuits through wires 35, 36 and 37 through the switch contact 29 and 32, thence to the magnet winding and thence back to the mains as indicated in the drawing, it being understood that each ejector plate 8 is controlled by one of the grading fingers 9 only, and will only operate when that particular grading finger is lifted to a predetermined point to close its contact point.

In operation of the machine, the various contacts of the different trailing arms 9 are set to close at predetermined points so that when an asparagus shoot of a certain size lifts its particular arm the magnet is energized and that particular spear of asparagus is at once struck by the ejector plate and ejected laterally from the conveyor and into its proper bin.

It is manifest that in this arrangement the arms or fingers 9 must be set to pick out the largest diameter of asparagus first, and succeeding arms will consecutively operate on spears of smaller diameter.

The bracket 25 which supports the pivoted fingers 9 is so formed as to form an abutment or stops for the fingers so that they cannot fall and drag on the conveyor plate 12 in case no asparagus is in position. The motion of the ejector plates is limited by the construction so that when the armature 22 is in contact with the magnet 20 the striker or ejector plate 8 will still be clear of the conveyor and not strike the same.

With the conveyor running in channels as shown it is held rigid against any effects of the striker plates operating on the asparagus, though on account of the counterweighting and balancing of the trailer fingers 9 there is very little tendency to displace the conveyor sidewise through resistance of the grass.

Instead of using a chain conveyor, it is manifest that a belt conveyor may be employed, and in which case it could conveniently take the form shown in perspective in Fig. 4 wherein a conveyor belt 38 is supported in a shallow groove or channel in a table or shelf 39 (in place of the channel 10 of Fig. 2), while secured to the top of the belt are separate plates 12 provided with spaced lugs 13 as described for the chain conveyor.

Attention is drawn to the fact that while I show a simple magnet operating the lever 18 to which the striker plates are attached, it is evident that this magnet may be of the solenoid type and directly strike the asparagus without the interposition of a lever as at 18, but I prefer the lever as it gives a greater throw to the striker plates with small motion of the magnet. It is also evident without further drawings that the magnet and striker plate lever may be in reverse relation so that the spring 23 will throw the lever forward for ejecting the asparagus, and the magnet may reverse or return the striker plate, thus operating by breaking the circuit instead of closing the same, but I prefer the arrangement shown for obvious reasons.

It will also be evident from the above description that the apparatus may be changed considerably without departing from the spirit of the invention, and as falling within the scope of the appended claims.

I claim:

1. In a sorting device, a support, a shelf positioned within said support, a belt-type conveyor movable over said shelf, a plurality of grader mechanisms positioned adjacent said conveyor, each of said grader mechanisms comprising a pivoted grading arm hanging over the conveyor, electrical contact means actuated by said arm and a kicker plate positioned adjacent said arm to the side of the conveyor adapted to move toward the edge of the conveyor, said kicker plate being actuated through the engagement of said contacts when said arm is lifted, and means for stopping said kicker plate before reaching the edge of the conveyor.

2. In a size grading apparatus for elongated units of various diameters, a conveyor arranged and adapted for conveying the units in spaced relation along a path of travel while projecting beyond one side of the conveyor, a plurality of movable devices spaced along the path of travel over the conveyor arranged for actuation by contact with the units of different diameters respectively, an ejector for each of said devices arranged for striking the projecting end of and ejecting a unit from the conveyor when its associated device is actuated.

3. In a size grading apparatus for asparagus stalks of various diameters, a slat conveyor arranged and adapted for conveying the stalks one against each slat transversely of the conveyor projecting beyond the conveyor, a plurality of fingers spaced along the conveyor each pivotally mounted at one end and adapted to rest with its free end lightly on the units so that they may pass thereunder, electrical contacts operated by said fingers, an electrically operated ejector adjacent each of said fingers arranged at the edge of the conveyor and adapted to eject a stalk transversely from the conveyor, said ejector actuated by the electrical contacts operated by the finger associated therewith.

4. In a size grading apparatus for units, means for moving the units along a path in tandem relation, a plurality of ejectors positioned along the path of travel each arranged and adapted to strike a unit and project it from the path of travel, electrically operated means for operating said ejectors, a conveyor of the chain or belt type provided with spaced pairs of spaced lugs projecting upwardly therefrom adapted for carrying along spears of asparagus lying transversely on the conveyor, movable devices overlying the conveyor one adjacent each ejector arranged to lightly ride up and down over the asparagus the devices passing beneath and passing through the gap between the pairs of lugs, electrically operated means actuated by said devices in rising, respectively, to predetermined points arranged and adapted for ejecting the asparagus transversely from the conveyor.

PARKER A. CUTTER.